United States Patent
Tackabury et al.

(10) Patent No.: US 11,151,266 B2
(45) Date of Patent: Oct. 19, 2021

(54) SECURE DATA STORAGE AND ACCESS DURING TRANSITION OPERATIONS

(71) Applicant: International Business Machines Corporation, Armonk, NY (US)

(72) Inventors: Wayne F. Tackabury, West Tisbury, MA (US); Doga Tav, Fredericton (CA); Ronald B. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 15/833,944

(22) Filed: Dec. 6, 2017

(65) Prior Publication Data

US 2019/0171829 A1  Jun. 6, 2019

(51) Int. Cl.
*H04L 29/06* (2006.01)
*G06F 21/62* (2013.01)
*G06F 21/60* (2013.01)

(52) U.S. Cl.
CPC ........ *G06F 21/6209* (2013.01); *G06F 21/602* (2013.01); *G06F 2221/2143* (2013.01)

(58) Field of Classification Search
CPC ............... G06F 21/6209; G06F 21/602; G06F 2221/2143
See application file for complete search history.

(56) References Cited

U.S. PATENT DOCUMENTS

| | | | |
|---|---|---|---|
| 6,453,342 B1 * | 9/2002 | Himmel | G06F 16/9574 709/213 |
| 6,847,719 B1 * | 1/2005 | Ballard | H04L 63/062 380/279 |
| 7,676,835 B2 | 3/2010 | Brannon et al. | |
| 7,685,368 B1 * | 3/2010 | Fickie | G06F 12/123 711/133 |
| 7,885,413 B2 | 2/2011 | Vasic et al. | |
| 8,171,560 B2 * | 5/2012 | Reus | H04L 9/0891 380/277 |
| 8,639,948 B2 | 1/2014 | Browning | |
| 9,164,924 B2 | 10/2015 | Horovitz et al. | |
| 9,306,917 B2 | 4/2016 | Brugger et al. | |
| 10,169,251 B1 * | 1/2019 | Whelihan | G06F 12/1408 |

(Continued)

OTHER PUBLICATIONS

Peterson, Peter A.H; Cryptkeeper: Improving Security With Encrypted RAM; 2010 IEEE International Conference on Technologies for Homeland Security (HST); 99. 120-126; IEEE; 2010.

(Continued)

*Primary Examiner* — Kevin Bechtel
*Assistant Examiner* — Hany S. Gadalla
(74) *Attorney, Agent, or Firm* — Anthony V.S. England; Jeffrey S LaBaw; Susan M. Maze

(57) ABSTRACT

A technique for secure data storage and access during transition operations includes retrieving an encrypted instance of a data object from a data store. The retrieved encrypted instance of the data object is stored in a cryptcache. The encrypted instance in the cryptcache is decrypted to a cleartext instance of the data object and stored as the cleartext instance of the data object in a clearcache. The clearcache instance of the data object is secured by controlling an access window defining an amount of time the cleartext instance of the data object is accessible in the clearcache.

20 Claims, 5 Drawing Sheets

(56) References Cited

U.S. PATENT DOCUMENTS

| | | | | |
|---|---|---|---|---|
| 2004/0093505 | A1* | 5/2004 | Hatakeyama | G06F 21/12 713/189 |
| 2006/0047972 | A1* | 3/2006 | Morais | G06F 12/1408 713/190 |
| 2006/0168262 | A1* | 7/2006 | Frazer | H04L 29/06 709/230 |
| 2010/0281223 | A1* | 11/2010 | Wolfe | G06F 12/0808 711/133 |
| 2010/0287385 | A1* | 11/2010 | Conte | G06F 12/0866 713/193 |
| 2012/0017097 | A1* | 1/2012 | Walrath | G06F 21/602 713/190 |
| 2014/0033019 | A1* | 1/2014 | Zhang | G06F 17/2247 715/234 |
| 2015/0052349 | A1* | 2/2015 | Gero | H04L 9/0891 713/153 |
| 2015/0143114 | A1* | 5/2015 | Chujo | H04L 67/1008 713/165 |
| 2015/0269091 | A1* | 9/2015 | Horovitz | G06F 21/79 711/145 |
| 2016/0050257 | A1* | 2/2016 | Cassidy | H04L 67/06 709/213 |
| 2016/0154746 | A1* | 6/2016 | Cooke | G06F 21/85 713/193 |
| 2016/0188494 | A1* | 6/2016 | Boivie | G06F 21/125 713/193 |
| 2018/0139192 | A1* | 5/2018 | Pishinov | H04L 63/0815 |

OTHER PUBLICATIONS

Wurstlein, Alexander et al.; Exzess: Hardware-based RAM Encryption against Physical Memory Disclosure; International Conference on Architecture of Computing Systems; pp. 60-71; Apr. 2016.

Schroepfer, Axel et al.; Secure Benchmarking in the Cloud; Proceedings of the 18th ACM Symposium on Access Control Models and Technologies; pp. 197-200; Jun. 2013.

Gelbukh, Oleg; Implementing Encryption Architecture with Cisco Webex for OpenStack Swift object storage; Mirantis'Open Cloud Digest (https://www.mirantis.com/blog/openstack-swift-encryption-architecture/); Sep. 28, 2012.

Amazon Web Services; AWS Key Management Service—Developer Guide; retrieved via http://docs.aws.amazon.com/; Original publication Nov. 11, 2014—Last updated Feb. 15, 2017.

Guri, Mordechai et al.; GSMem: Data Exfiltration from Air-Gapped Computers over GSM Frequencies; Proceedings of the 24th USENIX Security Symposium; Aug. 2015.

Skywiper Analysis Team; sKyWIper (aka Flame aka Flamer): A Complex Malware for Targeted Attacks; Laboratory of Cryptography and System Security (CrySyS Lab); Budapest University of Technology and Economics May 2012.

PCI Security Standards Council, Tokenization Product Security Guidelines—Irreversible and Reversible Tokens; Apr. 2015.

Coyne, Larry et al.; IBM Private, Public, and Hybrid Cloud Storage Solutions; IBM Redbook; Jan. 17, 2017.

* cited by examiner

SECURE DATA STORAGE AND ACCESS DURING TRANSITION OPERATIONS

BACKGROUND

Information security oftentimes is based on how specific data will be secured in storage (e.g., primary and secondary storage) for its processing. In the case of the longer-term lifecycle and retentive phases of that data, that may involve secondary and persistent storage. Persistent secure storage can take several concrete forms typically involving some sort of encryption. One form is the specific storage of field-level data, particularly for data which can be stored in an asymmetrically encrypted form. An example are password and challenge credentials in an authentication store for an operating system or application resource. Another example involves the delegation of a symmetric encryption to a backing store (e.g., a file system or database) where access to that data at the application level thereafter becomes transparent with respect to the decryption requirements for cleartext access. This application-transparent encryption layer can take the form of an application program interface (API), file system driver, or a layer imposing storage encryption and retrieval/read decryption over data natively stored encrypted on the back end store.

BRIEF SUMMARY

According to one aspect of the present disclosure, a method and technique for secure data storage and access during transition operations is disclosed. The method includes retrieving an encrypted instance of a data object from a data store. The retrieved encrypted instance of the data object is stored in a cryptcache. The encrypted instance in the cryptcache is decrypted to a cleartext instance of the data object and stored in a clearcache. The clearcache instance of the data object is secured by controlling an access window defining an amount of time the cleartext instance of the data object is accessible in the clearcache.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
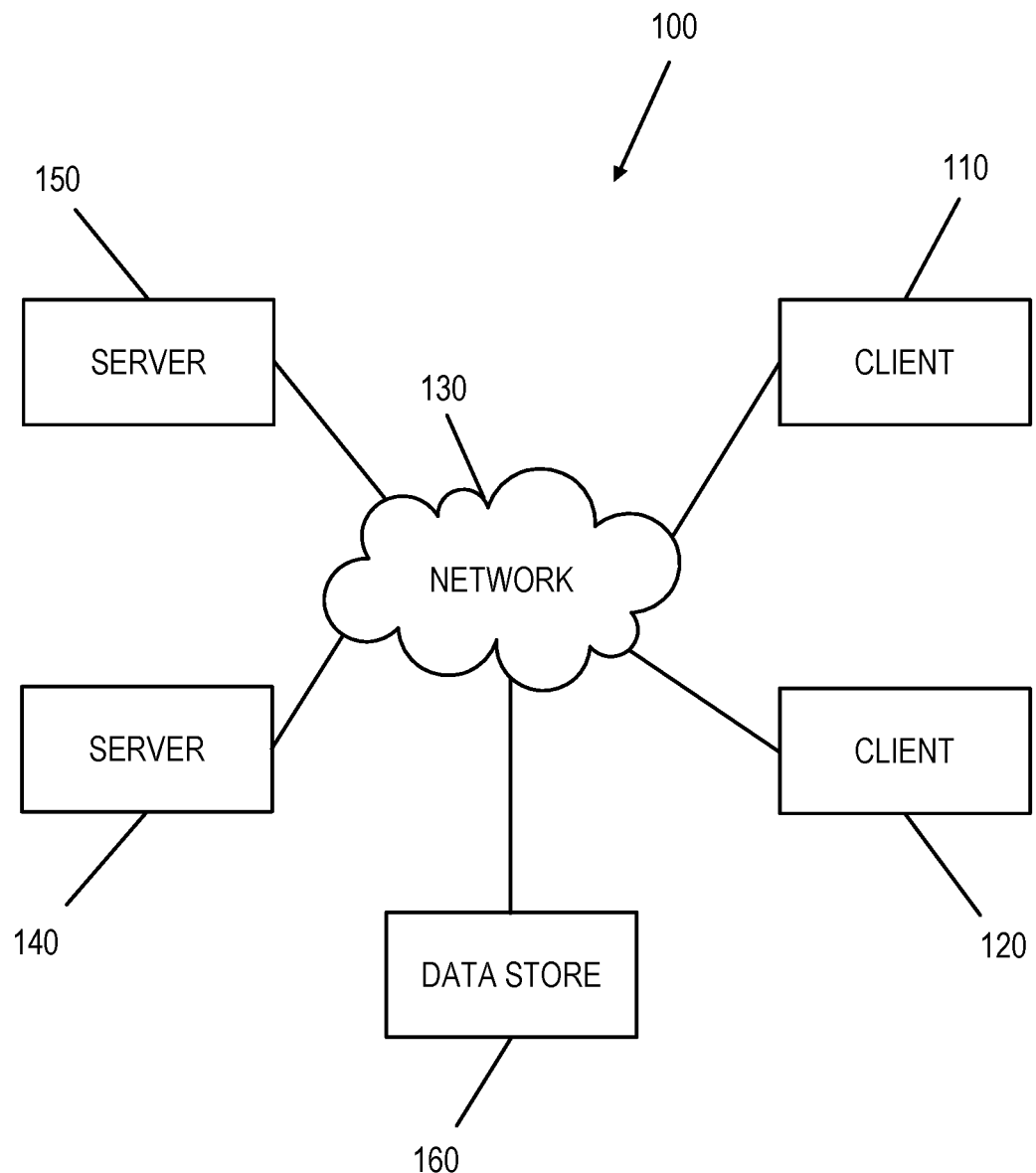
FIG. 1 is an embodiment of a network of data processing systems in which the illustrative embodiments of the present disclosure may be implemented.

Embodiments of the present disclosure provide a method, system and computer program product for secure data storage and access during transition operations. Embodiments of the present disclosure are configured to ensure secure treatment of data during transition operations (e.g., a transition from encrypted storage to a cleartext form, or vice versa). For example, instances of data retrieved from an encrypted store may exist in cleartext form during application buffering (e.g., after decryption) or may exist in cleartext form prior to being encrypted and stored in persistent storage (e.g., during a data migration process or after initial allocation/creation of data). During its cleartext state, the data may be susceptible to unauthorized access (e.g., resulting from local resource scanning by a Trojan horse process or malicious rootkit). Embodiments of the present disclosure integrate the caching of cleartext data with security and caching policies that are lifecycle operation aware to secure the data during a cleartext transition. Thus, for example, in some embodiments, the method and technique includes retrieving an encrypted instance of a data object from a data store. The retrieved encrypted instance of the data object is stored in a cryptcache (e.g., a portion of cache memory storing the data object in an encrypted format). The encrypted instance in the cryptcache is decrypted to a cleartext instance of the data object and stored in a clearcache (e.g., a portion of cache memory storing the data object in a cleartext format). The clearcache instance of the data object is secured by controlling an access window defining an amount of time the cleartext instance of the data object is accessible in the clearcache.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
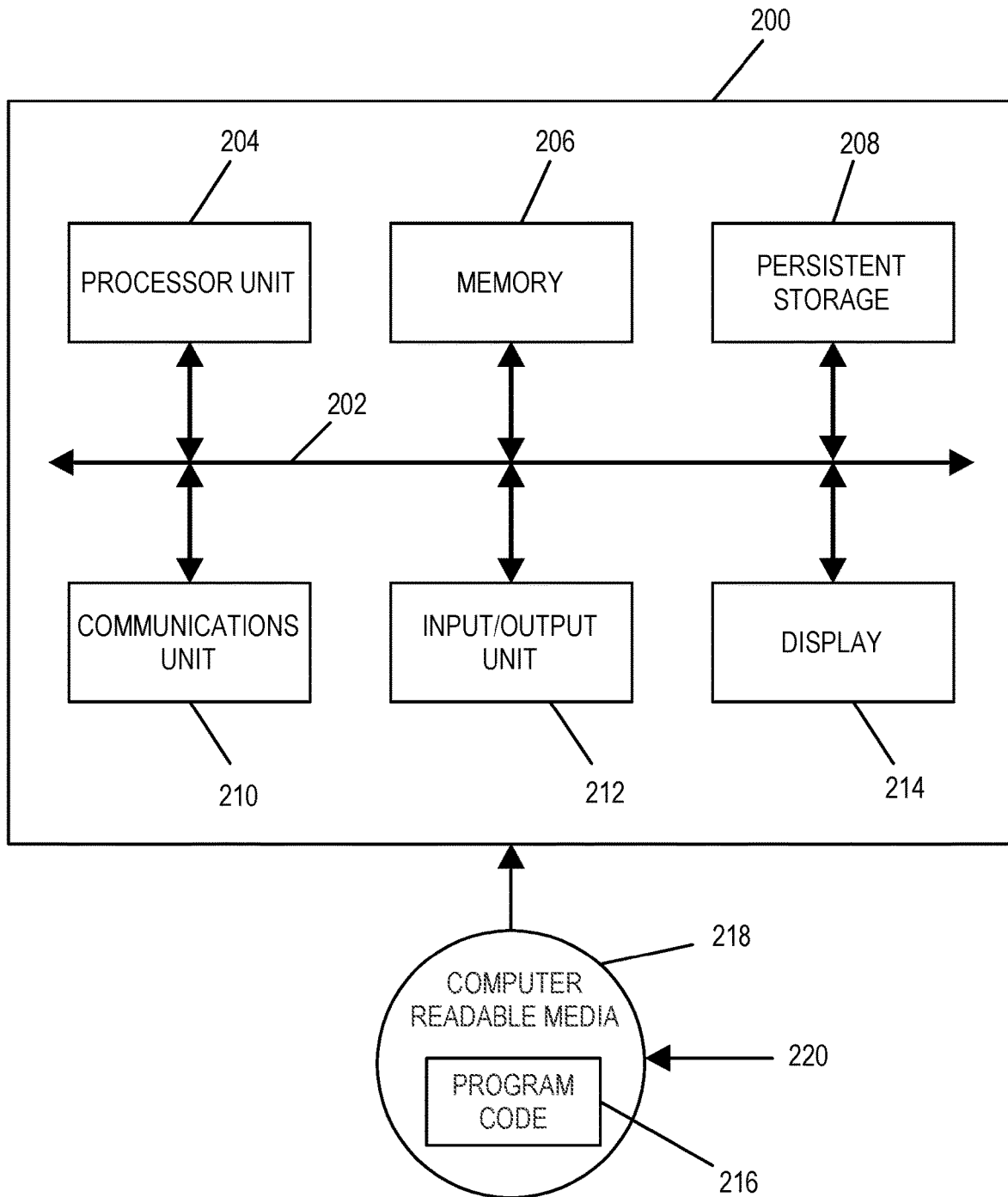
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for secure data storage and access during transition operations according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
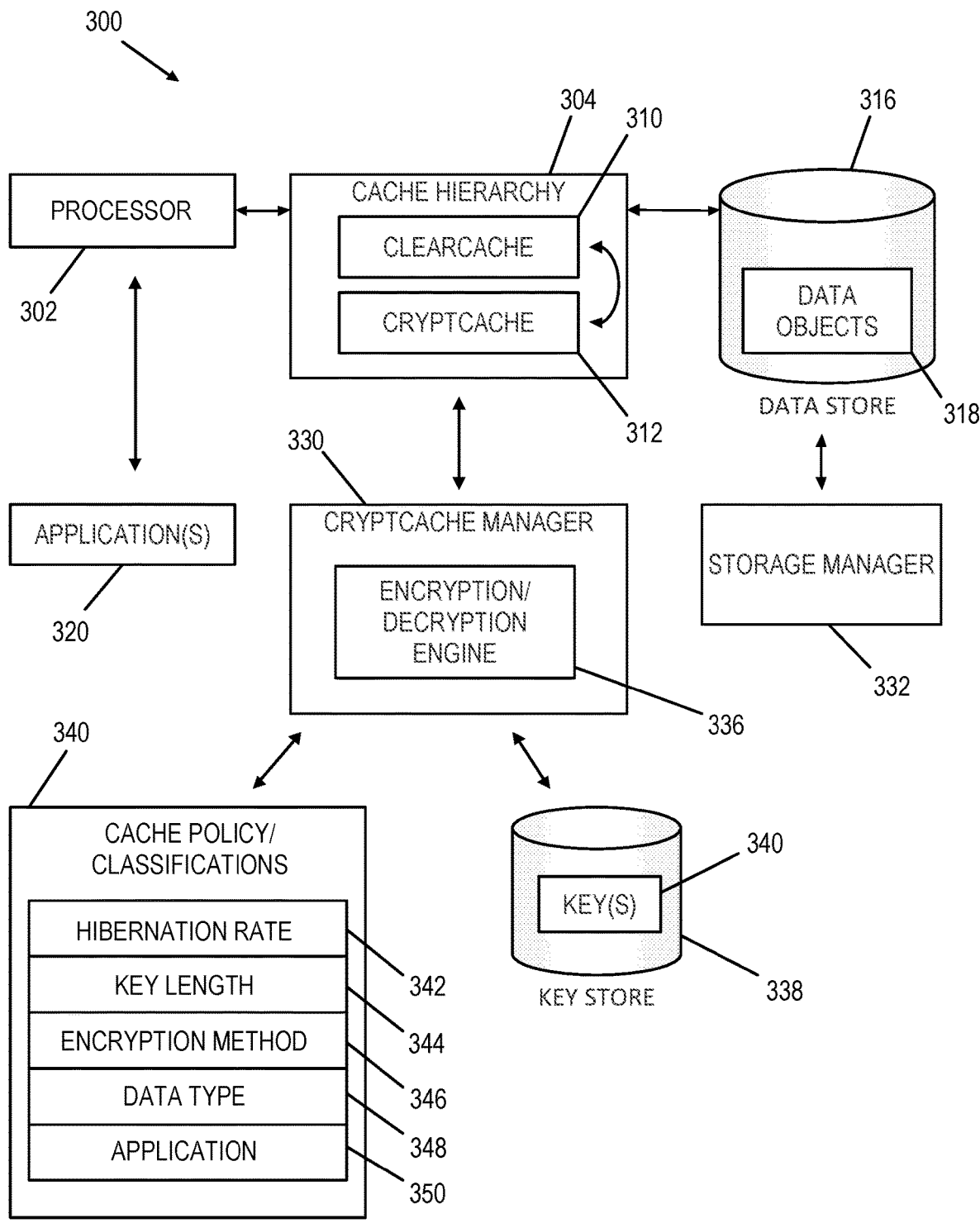
FIG. 3 is a diagram illustrating an embodiment of a data processing system in which illustrative embodiments of a system for secure data storage and access during transition operations according to the present disclosure may be implemented.

FIG. 3 is an illustrative embodiment of a system 300 for secure data storage and access during transition operations. Various components of system 300 may be implemented on data processing systems or platforms such as, but not limited to, servers 140 and/or 150, clients 110 and/or 120, or at other data processing system locations. In FIG. 3, system 300 illustrates an exemplary computing architecture having a processor 302 and a cache hierarchy 304. Cache hierarchy 304 may comprises one or more levels of cache memory (e.g., a type of volatile computer memory that provides high-speed data access to a processor and stores frequently used computer programs, applications and data (e.g., integrated directly on processor 302 chip or placed on a separate chip that has a separate bus interconnect with processor 302)). In the illustrated embodiment, cache hierarchy 304 is depicted having a clearcache 310 and a cryptcache 312. Clearcache 310 is a portion of cache memory (e.g., any level of cache memory (e.g., L1, L2, L3, etc.)) that stores an instance of a data object in cleartext form, and cryptcache 312 is a portion of cache memory (e.g., any level of cache memory (e.g., L1, L2, L3, etc.)) that stores an instance of a data object in encrypted form. In some embodiments, clearcache 310 and cryptcache 312 may comprise designated portions, blocks, entries, or lines of one or more levels of cache memory that are used to store cleartext and encrypted instances, respectively, of data being processed according to the present disclosure (e.g., exclusively). However, it should be understood that clearcache 310 and cryptcache 312 may be defined as any particular portion, block, entry, or line of cache memory that is used to store data in a cleartext or encrypted form, respectively, while such data is being processed (e.g., temporarily and/or nonexclusively). Thus, it should also be understood that while a certain entry of cache memory may be considered clearcache 310 or cryptcache 312 while storing therein the respective cleartext or encrypted form of data, such cache memory locations may also be used for other data caching purposes (e.g., identified and/or considered a clearcache 310 and/or cryptcache 312 entry only while processing data according to the present disclosure).

In FIG. 3, system 300 includes a data store 316 having one or more data objects 318 stored therein in an encrypted format. Data store 316 may be stored in a main memory of a particular host, computing node, or data processing system (e.g., system 300). However, it should be understood that data store 316 may be otherwise located and/or configured (e.g., network-attached backend storage, storage residing on another host, computing node, or data processing system in a parallel processing environment, etc.). In the illustrated embodiment, system 300 includes one or more applications 320 or computer programs that process data when executed by processor 302 (e.g., calling, requesting, creating, storing, etc., data objects 318).

In the illustrated embodiment, system 300 also includes a cryptcache manager 330 and a storage manager 332. Cryptcache manager 330 is configured to enable in-memory availability and access to data while controlling and minimizing the amount of time such data is in cleartext form by using various caching algorithms defined by various security policies and/or cache classifications. Storage manager 332 is configured to control filling of cache hierarchy 304 (e.g., cryptcache 312) with data from data store 316 and/or transferring data from cache hierarchy 304 (e.g., cryptcache 312) to data store 316. Cryptcache manager 330 and/or storage manager 332 may be implemented in any suitable manner using known techniques that may be hardware-based, software-based, or some combination of both. For example, cryptcache manager 330 and/or storage manager 332 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In FIG. 3, cryptcache manager 330 includes an encryption/decryption engine 336 with access to a key store 338 having one or more keys 340 for encrypting/decrypting data. For example, in some embodiments, encryption/decryption engine 336 performs on-the-fly encryption and decryption of clearcache 310 data object instances (e.g., using private key encryption methods and/or other types of encryption/decryption methods). System 300 also includes one or more cache policies/classifications 340. Cache policies/classifications 340 define various caching algorithms and/or security policies regarding the lifecycle and/or availability of accessible cleartext data. For example, in the illustrated embodiment, cache policies/classifications 340 include a hibernation rate 342, key length 344, encryption method 346, data type 348, and application 350 classifications that are used to control and manage the accessibility of cleartext data in clearcache 310. Hibernation rate 342, for example, dictates or defines how long (or an amount of time) a stored object spends in cleartext form in clearcache 310. Thus, hibernation rate 342 defines an access window for the availability and/or accessibility of an object in cleartext form in clearcache 310. Hibernation rate 342 may be time-based (e.g., measured in milliseconds), clock-based (e.g., a certain number or processor clock cycles), or based on another measurable parameter.

Key length 344, encryption method 346, data type 348, and application 350 classifications may be used to set or define certain hibernation rates 342 for certain data objects. For example, key length 344 may define a certain hibernation rate 342 based on a length of a particular key 340 used to encrypt/decrypt a particular data object. As an example, a longer key length may indicate an increased degree or level of encryption strength thereby indicating a greater need for data security for the corresponding data object. Accordingly, for a longer key length 344, the hibernation rate 342 may be shorter than a hibernation rate 342 for a shorter key length 344. Similarly, the type of data object (data type 348), the encryption method used to encrypt/decrypt a particular data object (encryption method 346), and the particular application 320 requesting and/or operating on a particular data object (application 350) may define a certain hibernation rate 342. As an example, certain types of data objects may be classified with a greater security level than others (e.g., credit card numbers versus unpublished research). Thus, certain types of data objects with higher security classifications may have shorter hibernation rates 342. Stronger encryption methods 346 may also be indicative of a greater need for data security for the corresponding data object. Accordingly, stronger encryption methods 346 used for certain data objects may set a shorter hibernation rate 342 for such data object. The application 320 requesting and/or operating on the data object may also be used to set or define a particular hibernation rate 342 for the data object (e.g., a particular application 320 used to perform payroll operations may indicate that the corresponding data object being operated on should be accorded a greater level of security and, thus, a shorted hibernation rate 342).

In operation, the present disclosure ensures secure treatment, according to various classifications and/or policies, of secure data while "in flight" or in a transitory state (e.g., from network attached backend storage, across nodes in a parallel processing environment, or within the very memory (or other) cached environment of one of those application nodes). For example, indexed object access in a relational object data store (e.g., data store 316) is augmented by a secure object access layer (e.g., via cryptcache manager 330 and/or storage manager 332). This layer and its services implement a hierarchical storage (e.g., clearcache 310 and cryptcache 312) with points in the hierarchy imposing varying degrees of encryption strength of the requested data. In some embodiments, this encryption strength is a direct determinant on access time and overhead for data to arrive or be available in cleartext form to the requesting application 320. For example, in some embodiments, storage manager 332 controls the pulling of instances of encrypted data objects 318 into cryptcache 312 directly usable for allocation of cleartext instances. Cryptcache 312 instances may be indexed by metadata attributes and thus functions as a persistent/serializable object store for encrypted instances of the data objects 318. Cryptcache 312 functions as a primary memory-persistent hold of the object in secure encrypted persistence with its own synchronization to the backend data store 316. This then represents a distributed "coldcache" for the instance data of the object. Clearcache 310 functions as the retention-managed allocated object store of cleartext instances of the data objects 318 (e.g., the distribution of object identity (controlled by cache or allocation reference) is independently managed for swap back from clearcache 310 to cryptcache 312, as a parallel to a hot-cache→cold cache migration).

In some embodiments, an application 320 query access can be realized via retrieval of an application token (e.g., using OAuth or another method) that enables clearcache 310 management to be controlled by stored or dynamically queried credentials. For example, the retrieved token can have a refresh lifetime equal to or some factor of the clearcache 310 hibernation rate 342 for the data object 318.

In operation, in response to a request to access a data object 318 stored in an encrypted format (e.g., from data store 316), storage manager 332 retrieves an instance of the encrypted data object 318 and stores the instance in cryptcache 312. In some embodiments, cryptcache manager 330 may interface with storage manager 332 and/or or be otherwise notified of the access request (e.g., via an application token or otherwise). Cryptcache manager 330 identifies the requested data object 318 and/or the particular application 320 requesting the object 318 and accesses key store 338 to obtain a key 340 for decrypting the encrypted instance of the object 318 stored in cryptcache 312. Cryptcache manager 330 may also access cache policy/classifications 340 (or use application token information) to identify a hibernation rate 342 for establishing or setting an access window for accessing a cleartext version of the object from clearcache 310. For example, as described above, cryptcache manager 330 may identify the application 320 requesting the object 318 (or the application 320 that created the object 318), identify an encryption method and/or key length used to encrypt/decrypt the object 318, identify the type of data object 318, or otherwise determine and set an access window or time period that the instance of the object 318 in cleartext form is available. For example, in some embodiments, the object 318 may be stored in data store 318 with the sufficient metadata to describe what is necessary for its clearcache 304 reconstitution (e.g., encryption type, key index, etc.), along with certain attributes to more than facilitate faceted search based on certain key attributes across the data store 316. Thus, in some embodiments, application-specific and/or application-driven policies (e.g., stored as cache policy/classifications 340 data or based on application token information) may define hibernation rate 342 or a length of the access window that the instance of the object 318 in cleartext form is available (e.g., in clearcache 310), a strength of key 340 (e.g., the length of key 340 and/or otherwise define a level or strength of encryption/protection method 346), a time period before moving an object from cryptcache 312 to permanent storage (e.g., some amount of time equal to or a factor of the hibernation rate 342 for the object 318 to define an amount of time the encrypted instance remains in cryptcache 312 before being transferred to permanent storage). In some embodiments, the application-specific policies or application-driven aspects may be set, defined, and/or modified by a user. Thus, in some embodiments, the particular application 320 collecting, requesting, creating, and/or operating on a particular object 318 may set and/or define that particular parameters for controlling the security of object 318 (e.g., access/availability during transition modes/operations, encryption strength, etc.). Thus, for example, for a particular application 320/350 used to collect, store, use, and/or modify personally identifiable information, cache policy/classifications 340 may define more stringent security parameters (e.g., a shorter hibernation rate 342) than for a particular application 320/350 operating on information deemed less sensitive (e.g., having a longer hibernation rate 342).

Cryptcache manager 330 decrypts the encrypted instance of the object 318 in cryptcache 312 to create a cleartext instance of the object 318 and stores the cleartext instance of the object 318 in clearcache 310. While in clearcache 310 (and while within the access window), the cleartext form of the object 318 may be accessed (e.g., by processor 302) and provided to the requesting application 320. Upon expiration of the access window (or expiration of the set time period) and regardless of whether the cleartext instance of the object 318 was accessed, cryptcache manager 330 causes the cleartext instance of the object 318 to be erased from clearcache 310 (e.g., deleting/purging the entry, overwriting the entry, etc.). After the cleartext instance of the object 318 has been removed from clearcache 310, if another call is received from the object 318, cryptcache manager 330 may re-decrypt the encrypted instance of the object remaining in cryptcache 312 (or pull another instance of the object 318 from data store 316 if the encrypted instance is no longer in cryptcache 312) to create another cleartext instance of the object 318 and store the new instance in clearcache 310 (and also initiate a new access window to enable access to the instance in clearcache 310).

In some embodiments, instead of retaining an encrypted instance of the object 318 in cryptcache 312 (e.g., after creating a cleartext instance), cryptcache manager 330 may cause the encrypted instance of the object 318 in cryptcache 312 to be erased from cryptcache 312 (e.g., deleting/purging the entry, overwriting the entry, etc.). In this embodiment, after expiration of the access window, cryptcache manager 330 may encrypt the cleartext instance in clearcache 310 to create a new encrypted instance of the object 318 and store the new encrypted instance of the object 318 in cryptcache 312 (e.g., to respond quickly to another call for the object 318).

The above-referenced process may also be used in somewhat reverse order for newly created or instantiated cleartext form objects 318. For example, in some embodiments, a newly created instance of a cleartext form of an object 318 may reside and/or be otherwise stored in clearcache 310 (e.g., by processor 302 as a result of application 320 processing). Cryptcache manager 330 may access cache policy/classifications 340 to determine how long (e.g., hibernation rate 342) the instance should remain in cleartext form. For example, the hibernation rate 342 may be set based on the encryption method 346 that will be used to encrypt the object 318, the key length 344 that will be used, the data type 348 of the object 318, the application 320/350 that created and/or otherwise caused the instantiation of the object 318, etc. Upon expiration of the access window based on the hibernation rate 342, cryptcache manager 330 may access key store 338 and obtain the key 340 for encrypting the instance and thereafter encrypt the cleartext instance. The encrypted instance of the object 318 may then be stored in cryptcache 312. Cache policy/classifications 340 may also be used to determine how the encrypted instances stored in cryptcache 312 are transferred to more permanent storage (e.g., data store 316). For example, in some embodiments, some amount of time equal to or a factor of the hibernation rate 342 may be used to set a transfer window indicating an amount of time the encrypted instance remains in cryptcache 312 before being transferred to permanent storage.

Thus, embodiments of the present disclosure afford in-memory availability and access to data while controlling and minimizing the amount of time such that data is in cleartext form by using caching algorithms controlled by various security policies and classifications. Moreover, the above-described process is performed transparently to the accessing application 320 and without imposing strict application entity access controls in particular.

Figure 4:
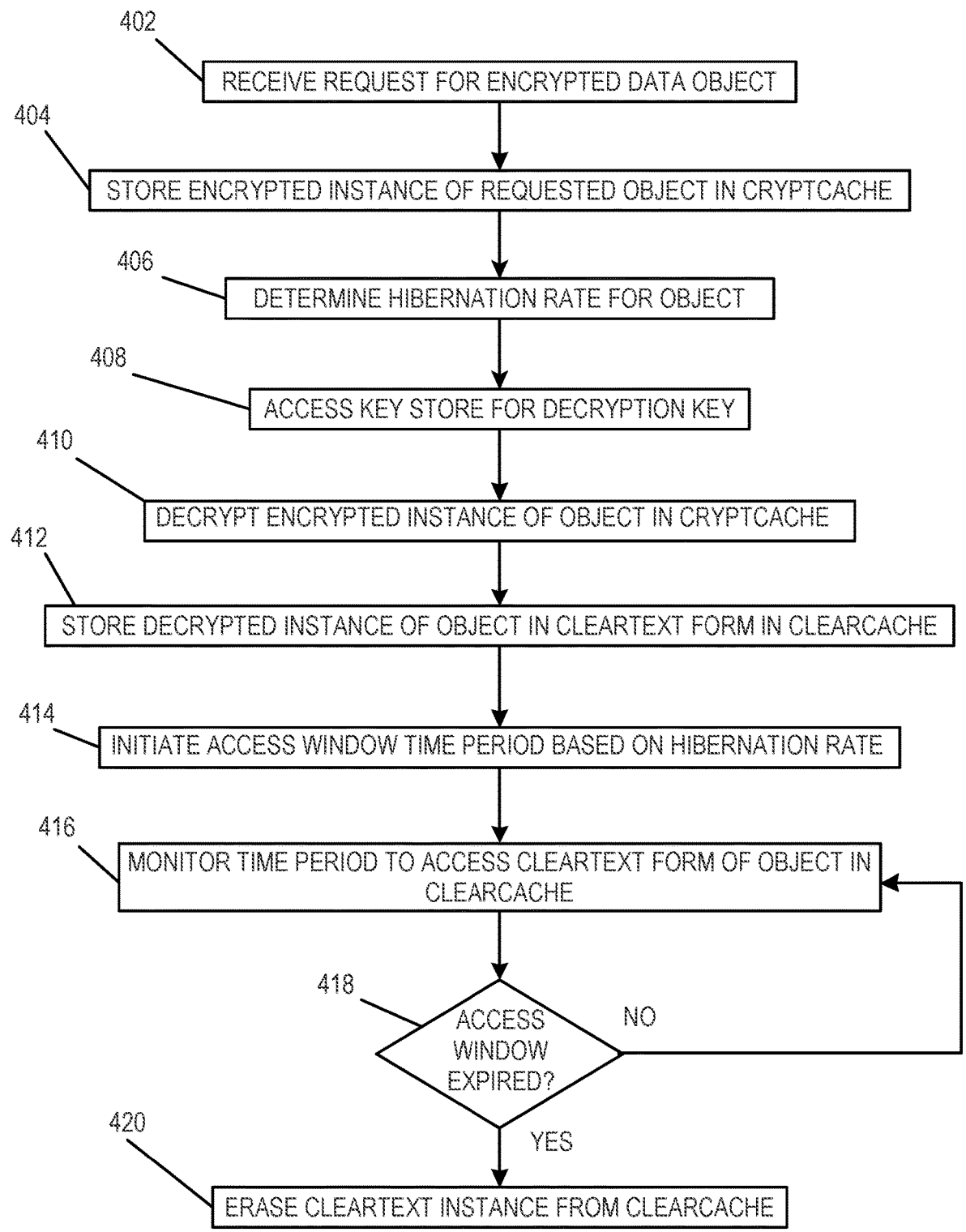
FIG. 4 is a flow diagram illustrating an embodiment of a method for secure data storage and access during transition operations according to the present disclosure.

FIG. 4 is a flow diagram illustrating an embodiment of a method for secure data storage and access during transition operations. The method begins at block 402, where a request for encrypted object is received. In this example, it is presumed that an encrypted instance of the requested object 318 does not already reside in cryptcache 312. At block 404, storage manager 332 causes the transfer and storage of an encrypted instance of the requested object 318 in cryptcache 312. At block 406, cryptcache manager 330 determines a hibernation rate 342 for the requested object 318. For example, as described above, cryptcache manager 330 may access cache policy/classifications 340 (or use application token information) to identify the hibernation rate 342 for establishing or setting an access window for maintaining an accessible cleartext version of the object in clearcache 310. For example, cryptcache manager 330 may identify the application 320 requesting the object 318 (or the application 320 that created the object 318), identify an encryption method and/or key length used to encrypt/decrypt the object 318, identify the type of data object 318, or otherwise determine and set an access window or time period that the instance of the object 318 in cleartext form is available.

At block 408, cryptcache manager 330 accesses key store 338 to obtain a key 340 for decrypting the encrypted instance of the object 318 stored in cryptcache 312. At block 410, cryptcache manager 330 decrypts the encrypted instance of the object 318 in cryptcache 312 to create a cleartext instance of the object 318. At block 412, cryptcache manager 330 stores the cleartext instance of the object 318 in clearcache 310. At block 414, cryptcache manager 330 initiates an access window defined by a time period that the object 318 is in cleartext form in clearcache 310 based on the hibernation rate 342. At block 416, cryptcache manager 330 monitors the time period for the access window. At decisional block 418, a determination is made whether the access window or corresponding time period limit for cleartext form has expired. If not, the method returns to block 416, where cryptcache manager 330 continues to monitor the time period for the access window. If at decisional block 418 a determination has been made that the access window has expired, the method proceeds from decisional block 418 to block 420, where cryptcache manager 330 causes the cleartext instance of the object 318 in clearcache 310 to be erased from clearcache 310.

Figure 5:
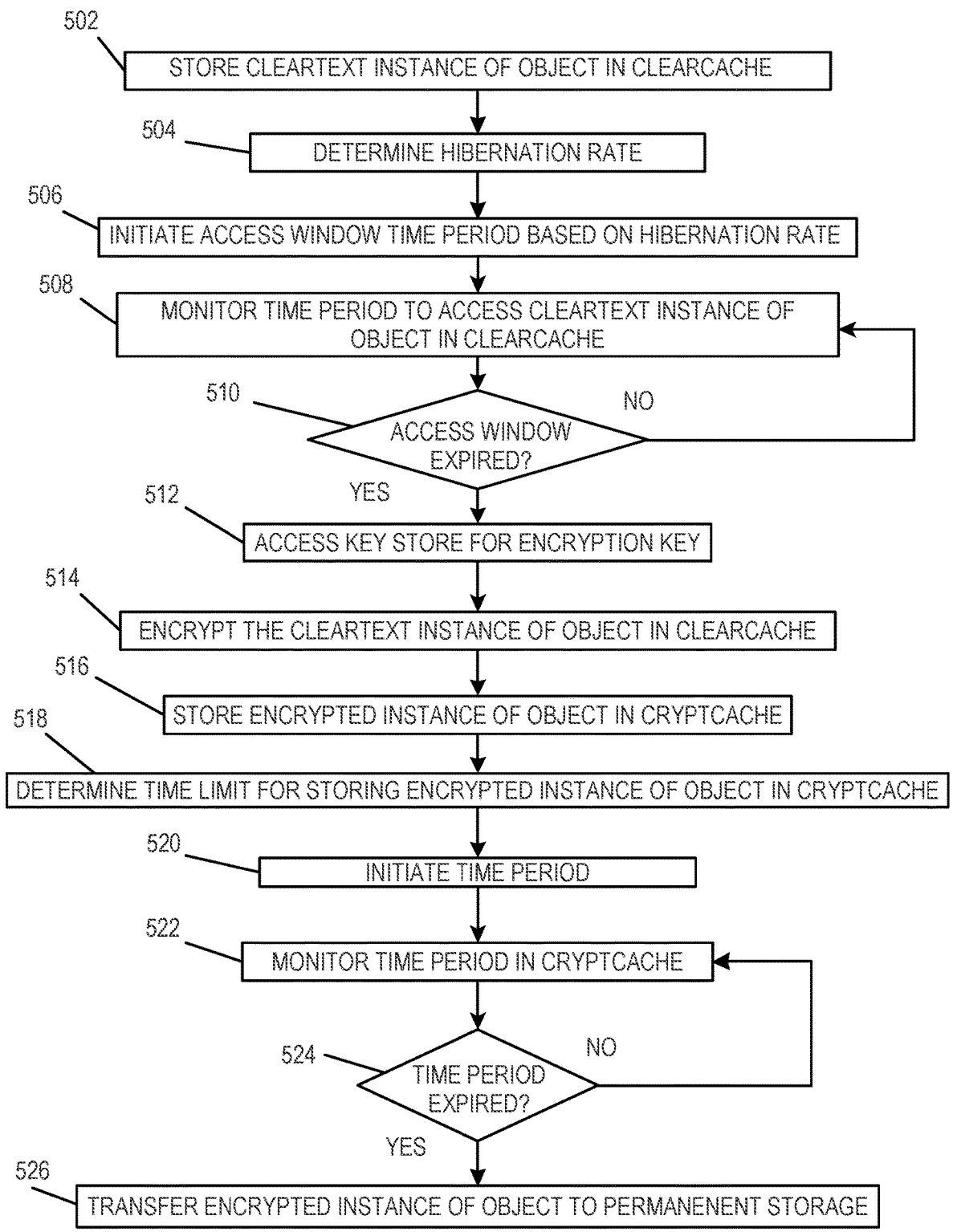
FIG. 5 is a flow diagram illustrating another embodiment of a method for secure data storage and access during transition operations according to the present disclosure.

FIG. 5 is a flow diagram illustrating another embodiment of a method for secure data storage and access during transition operations. The method begins at block 502, where cryptcache manager 330 stores a cleartext instance of an object 318 in clearcache 310 (e.g., as a result of application 320 processing, receipt of data to be migrated and stored, etc.). At block 504, cryptcache manager 330 determines a hibernation rate 342 for the cleartext instance of the object 318 stored in clearcache 310. For example, as described above, cryptcache manager 330 may access cache policy/classifications 340 to identify the hibernation rate 342 for establishing or setting an access window for maintaining an accessible cleartext version of the object in clearcache 310. For example, cryptcache manager 330 may identify the application 320 storing and/or otherwise operating on the object 318 (or the application 320 that created the object 318), identify an encryption method and/or key length that will be used to encrypt/decrypt the object 318, identify the type of data object 318, or otherwise determine and set an access window or time period that the instance of the object 318 in cleartext form is available.

At block 506, cryptcache manager 330 initiates an access window defined by a time period that the object 318 is maintained in cleartext form in clearcache 310 based on the hibernation rate 342. At block 508, cryptcache manager 330 monitors the time period for the access window. At decisional block 510, a determination is made whether the access window or corresponding time period limit for cleartext form has expired. If not, the method returns to block 508, where cryptcache manager 330 continues to monitor the time period for the access window. If at decisional block 510 a determination has been made that the access window has expired, the method proceeds from decisional block 510 to block 512, where cryptcache manager 330 accesses key store 338 to obtain a key 340 for encrypting the cleartext instance of the object 318 stored in clearcache 310. At block 514, cryptcache manager 330 encrypts the cleartext instance of the object 318 in clearcache 310 to create an encrypted instance of the object 318. At block 516, cryptcache manager 330 stores the encrypted instance of the object 318 in cryptcache 312.

At block 518, cryptcache manager 330 determines a policy for transferring the encrypted instance of the object in cryptcache 312 to permanent storage. For example, as described above, cryptcache manager 330 may set some amount of time equal to or a factor of the hibernation rate 342 for the object 318 to define an amount of time the encrypted instance remains in cryptcache 312 before being transferred to permanent storage. At block 520, cryptcache manager 330 initiates or sets a window or time period that the encrypted instance of the object remains in cryptcache 312. At block 522, cryptcache manager 330 monitors the set time period for expiration. At decisional block 524, a determination is made whether the set time period has expired. If not, the method returns to block 522, where cryptcache manager 330 continues to monitor the time period. If at decisional block 524 a determination has been made that the time period has expired, the method proceeds from decisional block 524 to block 526, where cryptcache manager 330 interfaces with and/or otherwise causes storage manager 332 to store an encrypted instance of the object in permanent storage (e.g., data store 316). In some embodiments, cryptcache manager 330 may also cause the encrypted instance of the object 318 in cryptcache 312 to be erased from cryptcache 312 (e.g., further limiting access thereto by an unauthorized process).

Thus, embodiments of the present disclosure prevent and/or mitigate attacks capable of targeting the interfaces between at-rest data in data store or network storage and the buffering of that data in process memory. For example, one threat to data security may include a rootkit installed Trojan horse that can intercept user process memory to exfiltrate secure application data. Embodiments of the present disclosure eliminate the efficacy of scanning of data of interest to such attacks to minimize the window of data availability to render the attacks ineffective in their exfiltration attempts.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
retrieving an encrypted instance of a data object from a data store;
storing the retrieved encrypted instance of the data object in a cryptcache;
determining an encryption strength corresponding to the encrypted instance of the data object;
determining a hibernation rate defined for the data object based on the encryption strength, the hibernation rate defining an amount of time the data object may be in a cleartext form, wherein the defined amount of time is a decreased amount responsive to an increase in the encryption strength and an increased amount responsive to a decrease in the encryption strength;
decrypting the encrypted instance in the cryptcache to a cleartext instance of the data object and storing the cleartext instance of the data object in a clearcache; and
securing the cleartext instance of the data object in the clearcache by setting an access window of the defined amount of time limiting availability to the cleartext instance of the data object in the clearcache corresponding to the hibernation rate, wherein access to the cleartext instance of the data object in the clearcache is limited to the decreased amount of time responsive to an instance of the encryption strength being an increased strength and limited to the increased amount of time responsive to an instance of the encryption strength being a decreased strength.

2. The method of claim 1, further comprising, in response to expiration of the access window, erasing the cleartext instance of the data object from the clearcache.

3. The method of claim 2, further comprising:
after expiration of the access window and erasure of the cleartext instance from the clearcache, responsive to receiving another call for the data object, re-decrypting the encrypted instance in the cryptcache to another cleartext instance;
storing the another instance in the clearcache;
initiating a new access window; and
enabling access to the another instance in the clearcache for the new access window.

4. The method of claim 1, further comprising:
identifying an application requesting access to the data object, wherein the requesting application operates on a certain data object type; and
defining the hibernation rate based on the requesting application, wherein the determining an encryption strength corresponding to the encrypted instance of the data object includes determining the certain data object type operated on by the application, and the defining the hibernation rate based on the requesting application includes defining the hibernation rate amount of time as increased for an application that operates on a data object type corresponding to decreased information sensitivity and decreased for an application that operates on a data object type corresponding to increased information sensitivity.

5. The method of claim 1, further comprising:
identifying a type of the data object being requested; and
defining the hibernation rate based on the type of the data object.

6. The method of claim 1, further comprising:
identifying an encryption method used to encrypt the data object being requested; and
defining the hibernation rate based on the encryption method.

7. The method of claim 1, further comprising:
identifying a key length used to encrypt the data object being requested; and
defining the hibernation rate based on the key length.

8. A system, comprising:
a data storage device having a data object stored therein in an encrypted format;
a storage manager configured to retrieve an encrypted instance of the data object from the data storage device and store the encrypted instance in a cryptcache; and a cryptcache manager configured to:
determine a hibernation rate defined for the data object based on the encryption strength, the hibernation rate defining an amount of time the data object may be in a cleartext form, wherein the defined amount of time is a decreased amount responsive to an increase in the encryption strength and an increased amount responsive to a decrease in the encryption strength;
decrypt the encrypted instance in the cryptcache to a cleartext instance of the data object and storing the cleartext instance of the data object in a clearcache; and
secure the cleartext instance of the data object in the clearcache by setting an access window of the defined amount of time limiting availability to the cleartext instance of the data object in the clearcache corresponding to the hibernation rate, wherein access to the cleartext instance of the data object in the clearcache is limited to the decreased amount of time responsive to an instance of the encryption strength being an increased strength and limited to the increased amount of time responsive to an instance of the encryption strength being a decreased strength.

9. The system of claim 8, wherein the cryptcache manager is configured to, in response to expiration of the access window, cause the cleartext instance of the data object to be erased from the clearcache.

10. The system of claim 9, wherein the cryptcache manager is configured after expiration of the access window and erasure of the cleartext instance from the clearcache, responsive to receiving another call for the data object, re-decrypt the encrypted instance in the cryptcache to another cleartext instance;
    store the another instance in the clearcache;
    initiate a new access window; and
    enable access to the another instance in the clearcache for the new access window.

11. The system of claim 8, wherein the cryptcache manager is configured to:
    identify an application requesting access to the data object, wherein the requesting application operates on a certain data object type; and
    define the hibernation rate based on the requesting application, wherein the determining an encryption strength corresponding to the encrypted instance of the data object includes determining the certain data object type operated on by the application, and the defining the hibernation rate based on the requesting application includes defining the hibernation rate amount of time as increased for an application that operates on a data object type corresponding to decreased information sensitivity and decreased for an application that operates on a data object type corresponding to increased information sensitivity.

12. The system of claim 8, wherein the cryptcache manager is configured to:
    identify a type of the data object being requested; and
    define the hibernation rate based on the type of the data object.

13. The system of claim 8, wherein the cryptcache manager is configured to:
    identify an encryption method used to encrypt the data object being requested; and define the hibernation rate based on the encryption method.

14. The system of claim 8, wherein the cryptcache manager is configured to:
    identify a key length used to encrypt the data object being requested; and
    define the hibernation rate based on the key length.

15. A computer program product for secure data storage and access, the computer program product comprising a computer readable storage medium having program instructions embodied therewith, the program instructions executable by a processor to cause the processor to:
    retrieve an encrypted instance of a data object from a data store;
    store the retrieved encrypted instance of the data object in a cryptcache;
    determine a hibernation rate defined for the data object based on the encryption strength, the hibernation rate defining an amount of time the data object may be in a cleartext form, wherein the defined amount of time is a decreased amount responsive to an increase in the encryption strength and an increased amount responsive to a decrease in the encryption strength;
    decrypt the encrypted instance in the cryptcache to a cleartext instance of the data object and storing the cleartext instance of the data object in a clearcache; and
    secure the cleartext instance of the data object in the clearcache by setting an access window of the defined amount of time limiting availability to the cleartext instance of the data object in the clearcache corresponding to the hibernation rate, wherein access to the cleartext instance of the data object in the clearcache is limited to the decreased amount of time responsive to an instance of the encryption strength being an increased strength and limited to the increased amount of time responsive to an instance of the encryption strength being a decreased strength.

16. The computer program product of claim 15, wherein the program
    instructions are executable by the processor to, in response to expiration of the access window, cause the cleartext instance of the data object to be erased from the clearcache.

17. The computer program product of claim 15, wherein the program instructions are executable by the processor to cause the processor to:
    identify an application requesting access to the data object, wherein the requesting application operates on a certain data object type; and
    define the hibernation rate based on the requesting application, wherein the determining an encryption strength corresponding to the encrypted instance of the data object includes determining the certain data object type operated on by the application, and the defining the hibernation rate based on the requesting application includes defining the hibernation rate amount of time as increased for an application that operates on a data object type corresponding to decreased information sensitivity and decreased for an application that operates on a data object type corresponding to increased information sensitivity.

18. The computer program product of claim 17, wherein the program instructions are executable by the processor to:
    identify a type of the data object being requested; and
    define the hibernation rate based on the type of the data object.

19. The computer program product of claim 15, wherein the program instructions are executable by the processor to cause the processor to:
    identify an encryption method used to encrypt the data object being requested; and
    define the hibernation rate based on the encryption method.

20. The computer program product of claim 19, wherein the program instructions are executable by the processor to cause the processor to:
    identify a key length used to encrypt the data object being requested; and
    define the hibernation rate based on the key length.

\* \* \* \* \*